(12) United States Patent
Zhang et al.

(10) Patent No.: US 10,590,892 B2
(45) Date of Patent: Mar. 17, 2020

(54) METHODS AND SYSTEMS FOR VACUUM GENERATION USING A THROTTLE

(71) Applicant: Ford Global Technologies, LLC, Dearborn, MI (US)

(72) Inventors: Xiaogang Zhang, Novi, MI (US); Jianwen James Yi, West Bloomfiled, MI (US); Brad VanDerWege, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/842,782

(22) Filed: Dec. 14, 2017

(65) Prior Publication Data

US 2019/0186446 A1 Jun. 20, 2019

(51) Int. Cl.
| | |
|---|---|
| *F02M 35/10* | (2006.01) |
| *F02D 41/00* | (2006.01) |
| *F02D 9/10* | (2006.01) |
| *F02D 11/10* | (2006.01) |
| *F02D 9/02* | (2006.01) |
| *F02D 29/02* | (2006.01) |
| *F02D 13/02* | (2006.01) |

(52) U.S. Cl.
CPC ......... *F02M 35/10229* (2013.01); *F02D 9/02* (2013.01); *F02D 9/10* (2013.01); *F02D 9/104* (2013.01); *F02D 11/10* (2013.01); *F02D 29/02* (2013.01); *F02D 41/0002* (2013.01); *F02D 13/0203* (2013.01); *F02D 2009/024* (2013.01); *F02D 2200/0404* (2013.01); *F02D 2250/41* (2013.01)

(58) Field of Classification Search
CPC . F02M 35/10229; F02D 13/0203; F02D 9/10; F02D 41/0002; F02D 11/10; F02D 2250/41; F02D 2009/024; F02D 2200/0404
See application file for complete search history.

(56) References Cited

U.S. PATENT DOCUMENTS

| | | | | |
|---|---|---|---|---|
| 3,666,235 A | * | 5/1972 | Scott | F16K 1/22 251/118 |
| 4,047,696 A | * | 9/1977 | Ludwig | F16K 1/22 251/308 |
| 8,181,453 B2 | | 5/2012 | Goplen et al. | |

(Continued)

FOREIGN PATENT DOCUMENTS

EP 1469258 A1 10/2004

OTHER PUBLICATIONS

Zhang, X, "Method and System for Vacuum Generation Using a Throttle," U.S. Appl. No. 15/247,492, filed Aug. 25, 2016, 42 pages.

*Primary Examiner* — Xiao En Mo
(74) *Attorney, Agent, or Firm* — Geoffrey Brumbaugh; McCoy Russell LLP

(57) ABSTRACT

Methods and systems are provided for generating vacuum via a throttle. In one example, a method may comprise rotating the throttle to a first fully closed position to provide vacuum to a first vacuum consumption device and rotating the throttle to a second fully closed position to provide vacuum to a second vacuum consumption device. The method may further include rotating the throttle to a partially closed position to provide vacuum to both the first and second vacuum consumption devices.

14 Claims, 8 Drawing Sheets

(56) References Cited

U.S. PATENT DOCUMENTS

| | | |
|---|---|---|
| 8,261,716 B2 | 9/2012 | Bergbauer et al. |
| 9,651,004 B2 | 5/2017 | Zhang |
| 9,816,532 B2 | 11/2017 | Zhang |
| 2003/0111065 A1 | 6/2003 | Blum |
| 2014/0165962 A1* | 6/2014 | Pursifull ................ B60T 13/46 |
| | | 123/349 |
| 2015/0285160 A1 | 10/2015 | Zhang |
| 2017/0138276 A1 | 5/2017 | Zhang |
| 2017/0138277 A1 | 5/2017 | Zhang |

* cited by examiner

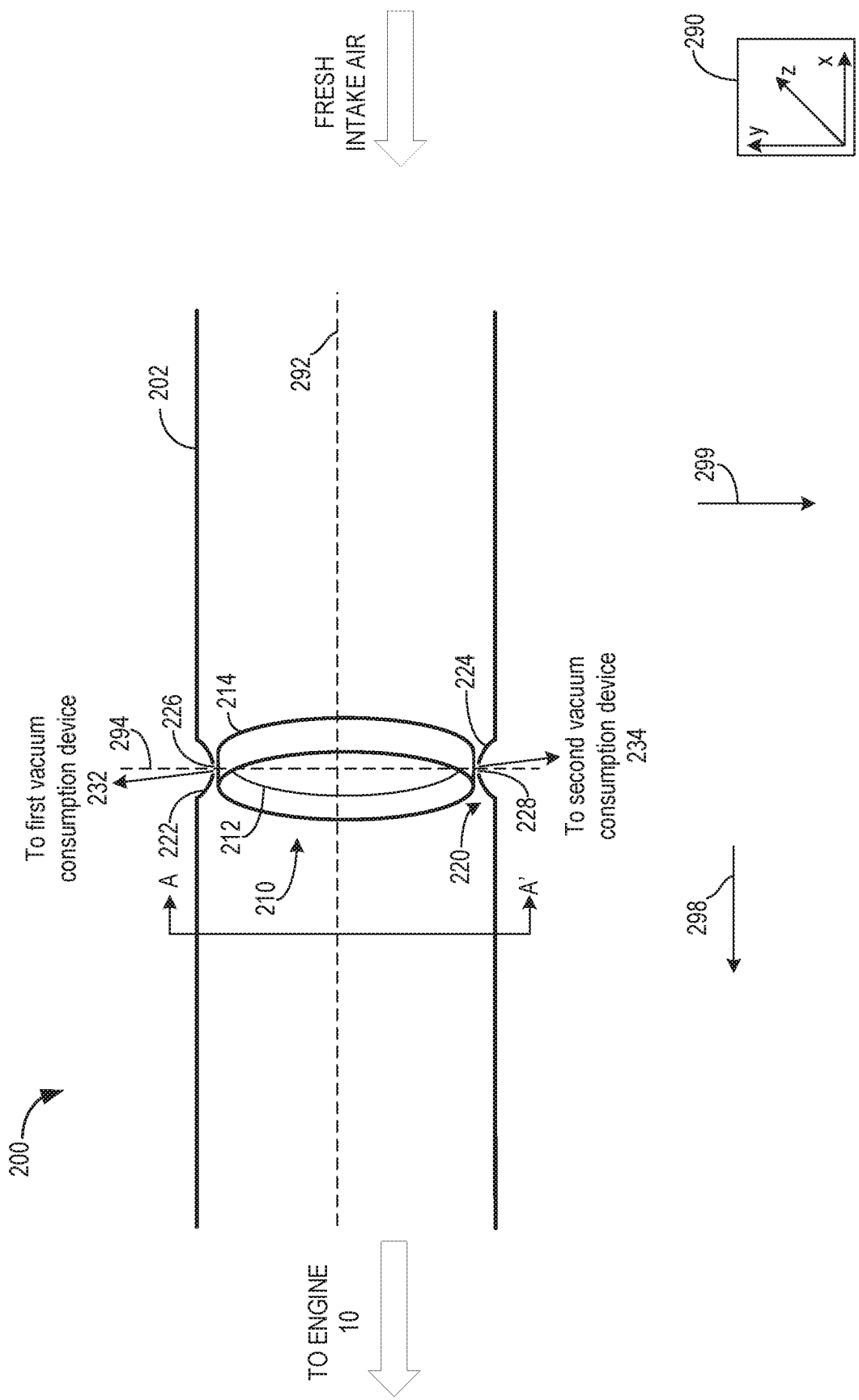

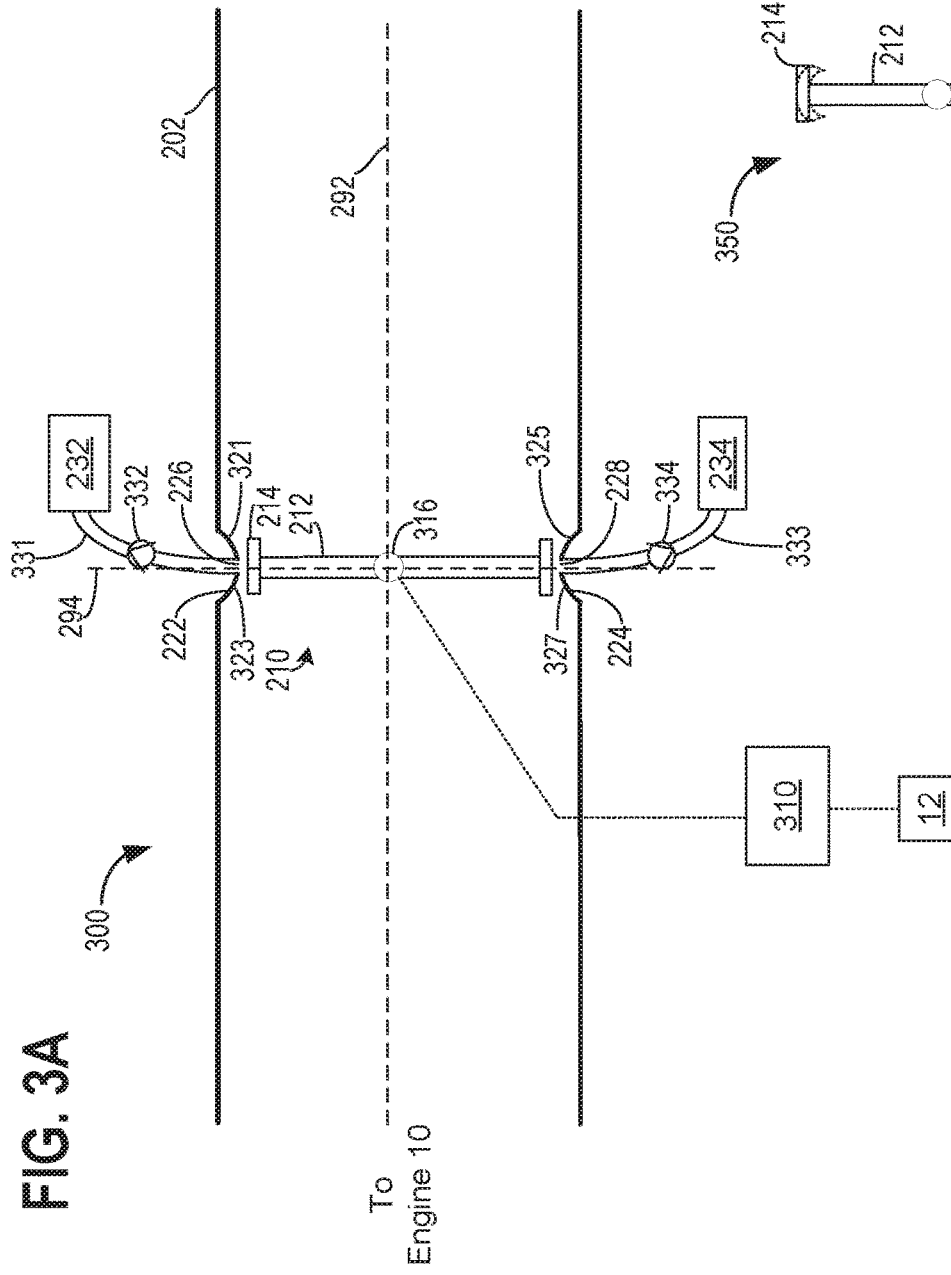

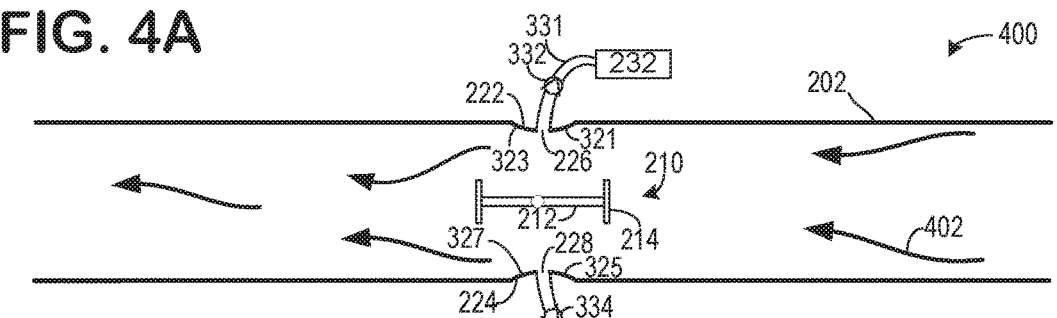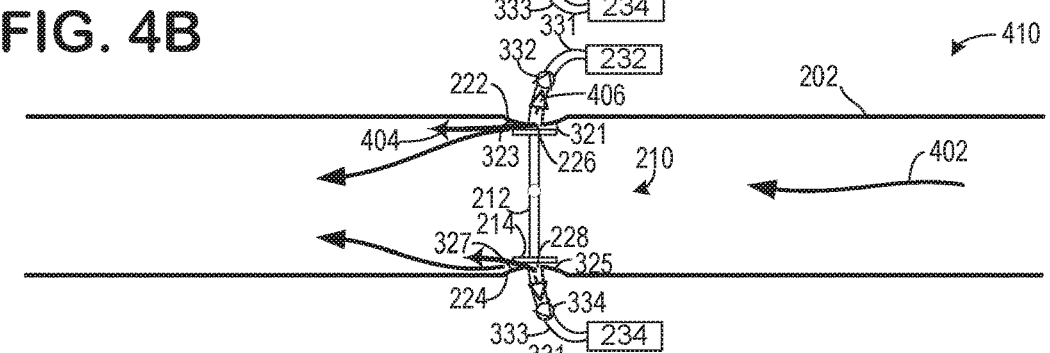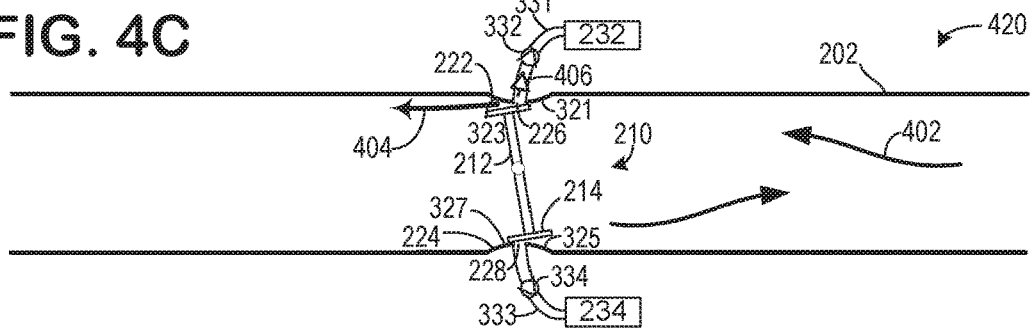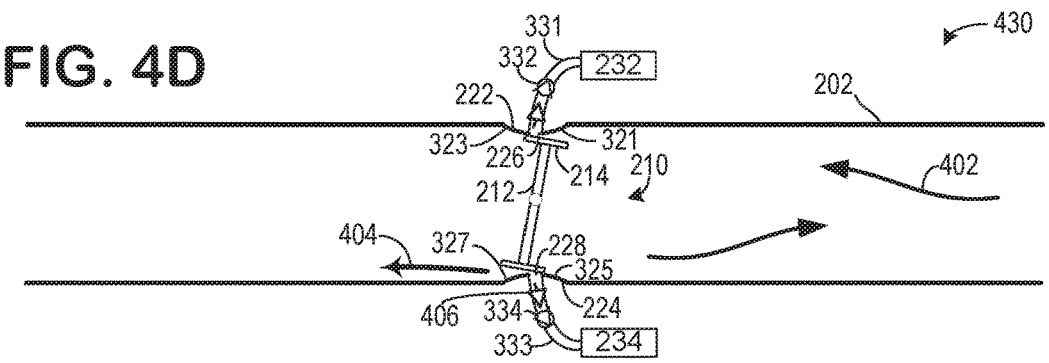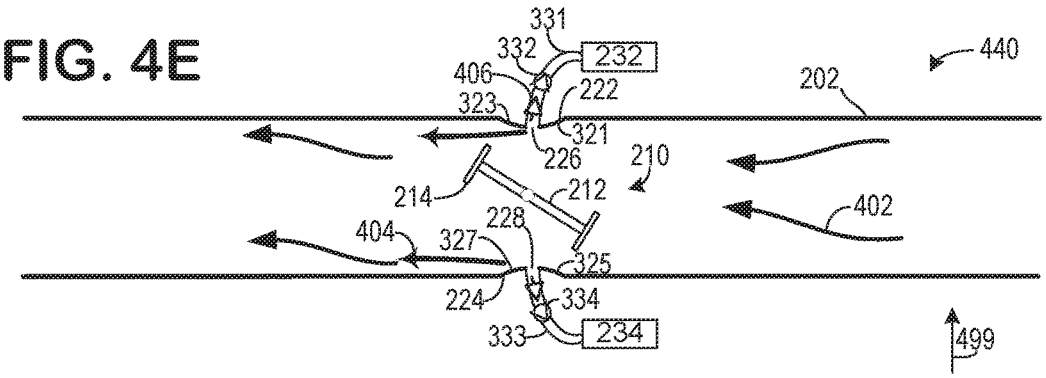

METHODS AND SYSTEMS FOR VACUUM GENERATION USING A THROTTLE

FIELD

The present description relates generally to vacuum generation in an intake via a throttle plate.

BACKGROUND/SUMMARY

Vehicle systems may include various vacuum consumption devices that are actuated using vacuum. These may include, for example, a brake booster and a purge canister. Vacuum used by these devices may be provided by a dedicated vacuum pump. In other embodiments, one or more aspirators (alternatively referred to as ejectors, venturi pumps, jet pumps, and eductors) may be coupled in the engine system that may harness engine airflow and use it to generate vacuum.

In another example embodiment shown by Bergbauer et al. in U.S. Pat. No. 8,261,716, a control bore is located in the wall of the intake such that when the throttle plate is at idle position, vacuum generated at the periphery of the throttle is used for a vacuum consumption device. Therein, the positioning of the throttle plate in an idle position provides a constriction at the throttle plate's periphery. The increasing flow of intake air through the constriction results in a venturi effect that generates a partial vacuum. The control bore is sited so as to utilize the partial vacuum for a vacuum consumption device.

The inventors herein have identified potential issues with the above approach. As an example, the vacuum generation potential of the throttle is limited. For example, a single control bore at one location in the intake, as shown in U.S. Pat. No. 8,261,716, is utilized by the vacuum consumption device even though vacuum may be generated at the entire periphery of the throttle. To use vacuum generated at the entire periphery of the throttle, more control bores may be needed in the intake passage. However, fabricating these control bores may result in significant modifications to the design of the intake passage which can increase related expenses.

In the approaches that use one or more aspirators to generate vacuum, additional expenses may be incurred because of individual parts that form the aspirator including nozzles, mixing and diffusion sections, and check valves. Further, at idle or low load conditions, it may be difficult to control the total air flow rate into the intake manifold since the flow rate is a combination of leakage flow from the throttle and airflow from the aspirator. Typically, an aspirator shut off valve (ASOV) may be included along with the aspirator to control airflow but with added cost. Further, installing aspirators in the intake can lead to constraints on space availability as well as packaging issues.

In one example, the issues described above may be addressed by a method comprising adjusting a throttle valve to a first fully closed position in response to vacuum of a first vacuum consumption device being less than a threshold vacuum, and adjusting the throttle valve to a second fully closed position in response to vacuum of a second vacuum consumption device being less than the threshold vacuum. In this way, when operating in each of the vacuum conditions, the throttle may be actuated to two different fully closed positions to provide a deep vacuum to either of the first or second vacuum consumption devices.

As one example, the throttle is arranged in an intake passage comprising a plurality of protrusions, wherein the protrusions constrict a flow-through area of the intake passage. A position of the throttle with respect to the protrusions may adjust intake air flow such that a vacuum may be generated at the protrusions. The vacuum may be supplied to the first and second vacuum consumption devices. In the first and second fully closed positions, intake air may not flow passed the throttle, however, vacuum generated due to a low engine power output (e.g., low load or idle) may be supplied to the first and second vacuum consumption devices, respectively.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows an isometric view of a throttle arranged in an intake passage having a plurality of protrusions.

FIG. 3A shows a cross-sectional view of the throttle and a coupling between each of one or more vacuum consumption devices to each of the plurality of protrusions.

FIG. 3B shows a detailed view of the throttle.

FIGS. 4A, 4B, 4C, 4D, and 4E show various positions of the throttle in relation to the plurality of protrusions.

FIGS. 2, 5, and 6 are shown approximately to scale, however, other alternate dimensions may be used.

DETAILED DESCRIPTION

Figure 1:
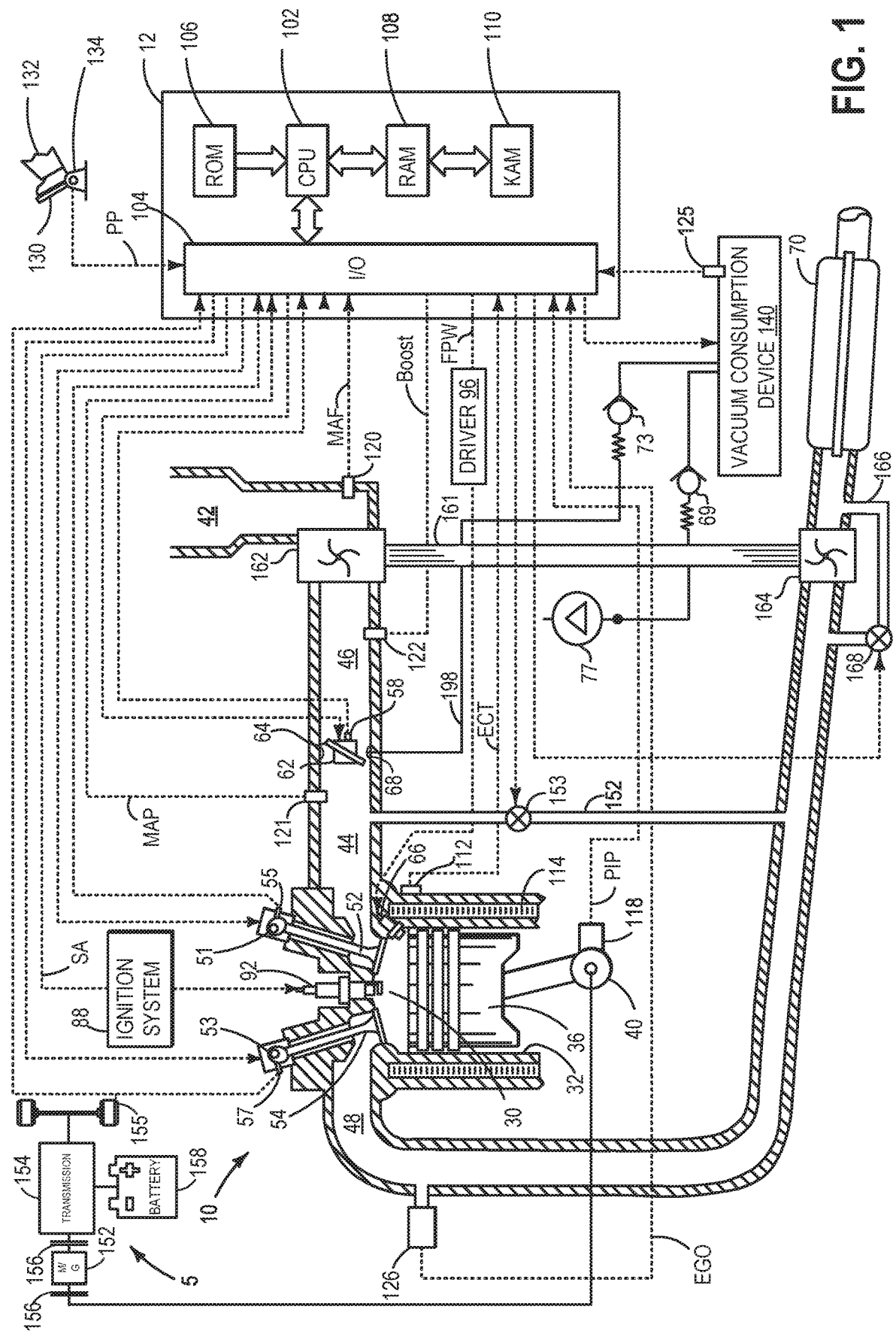
FIG. 1 portrays a schematic diagram of an engine in accordance with the present disclosure.
Figure 5:
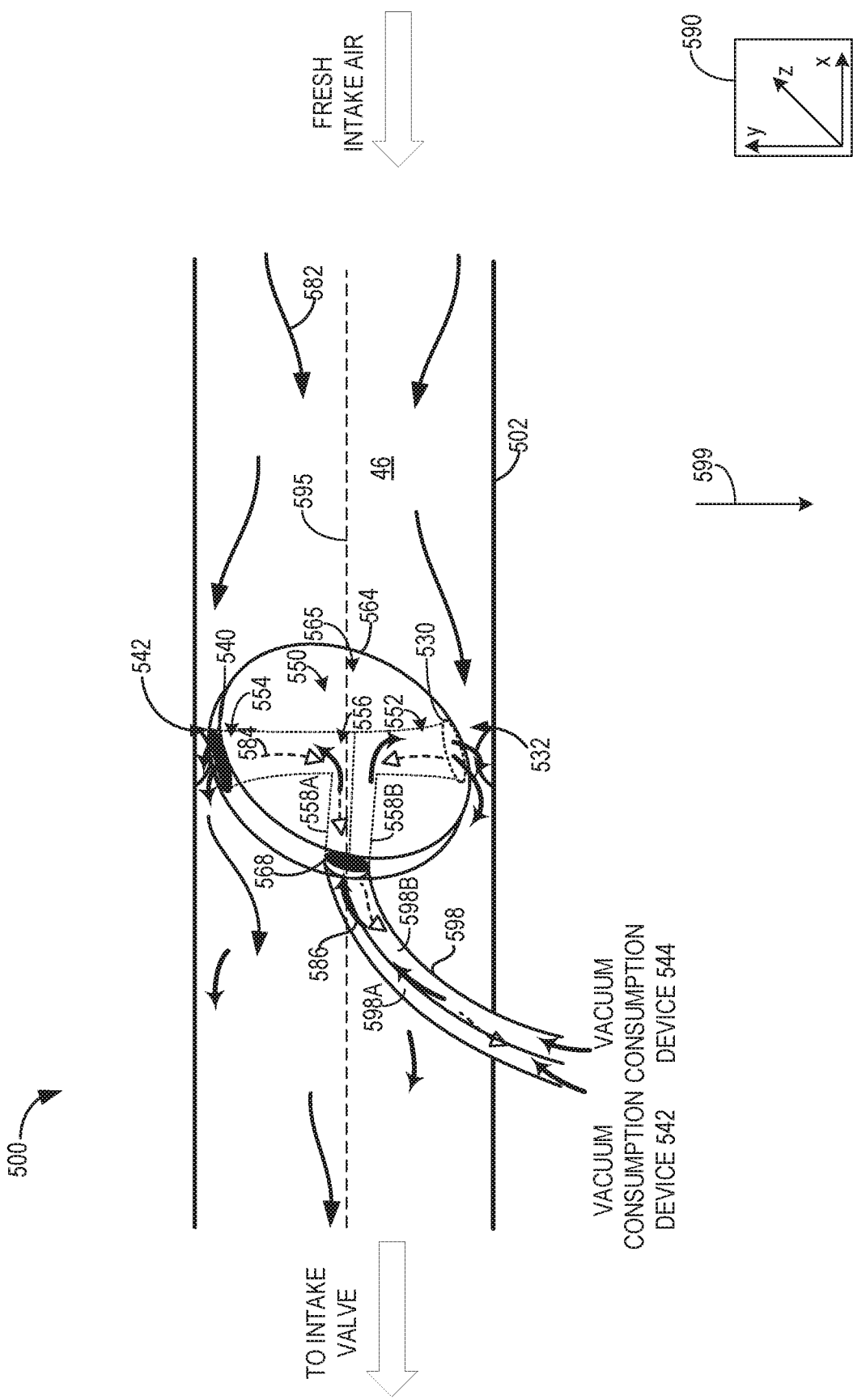
FIG. 5 shows a further embodiment of the throttle.
Figure 6:
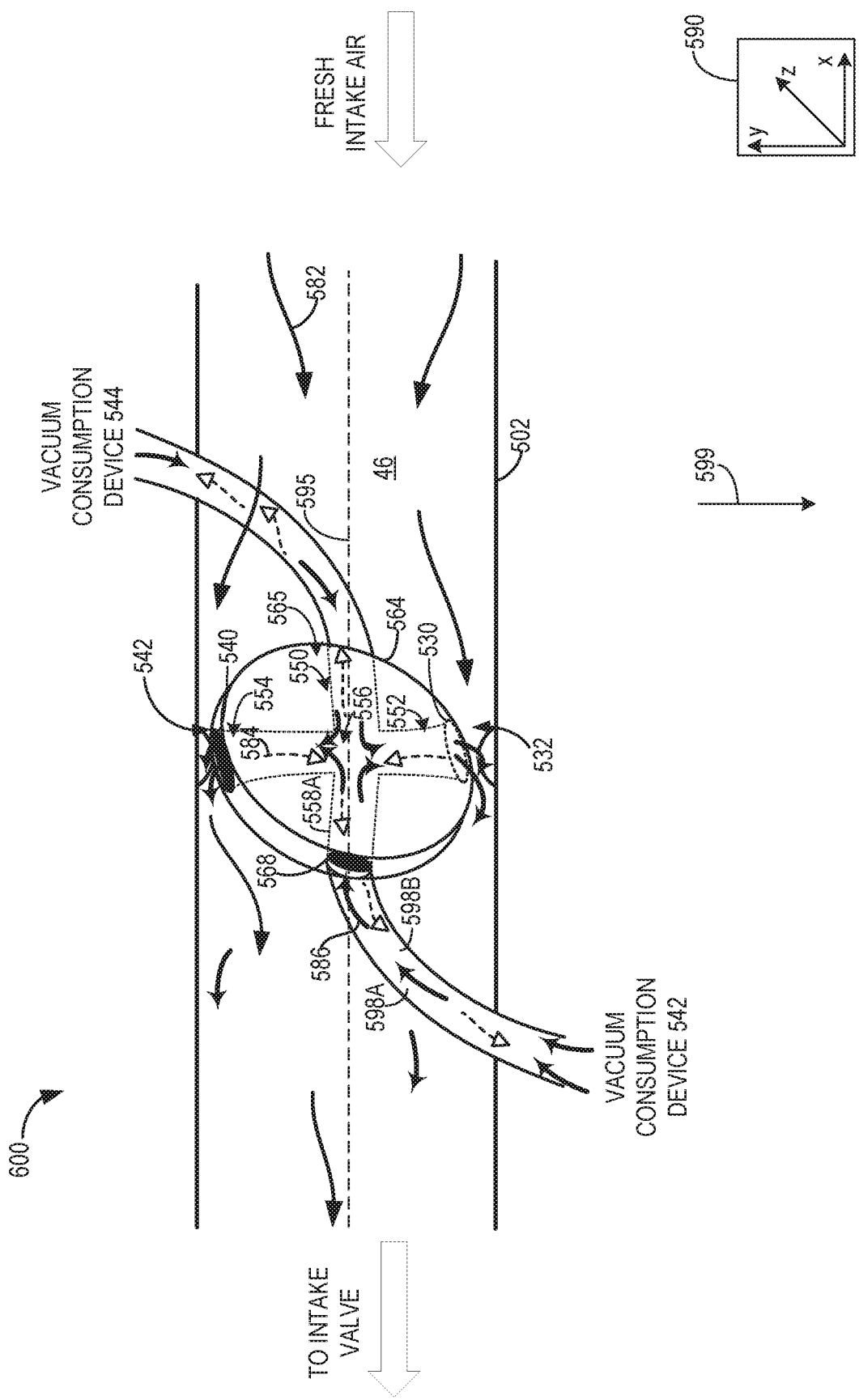
FIG. 6 shows an additional embodiment of the throttle.

The following description relates to systems and methods for generating vacuum within an intake passage in an engine, such as the engine system shown in FIG. 1. The intake passage may comprise one or more protrusions corresponding to one or more vacuum consumption devices, as shown in FIG. 2. FIGS. 3A and 3B show a cross-section of a throttle of the intake system configured to communicate with the one or more protrusions of the intake passage. FIGS. 4A to 4E show various positions of the throttle in response to a vacuum demand from one or more vacuum consumption devices. FIGS. 5 and 6 show additional embodiments of the throttle, where the throttle is partially hollow and configured to communicate with one or more vacuum consumption devices.

Figure 7:
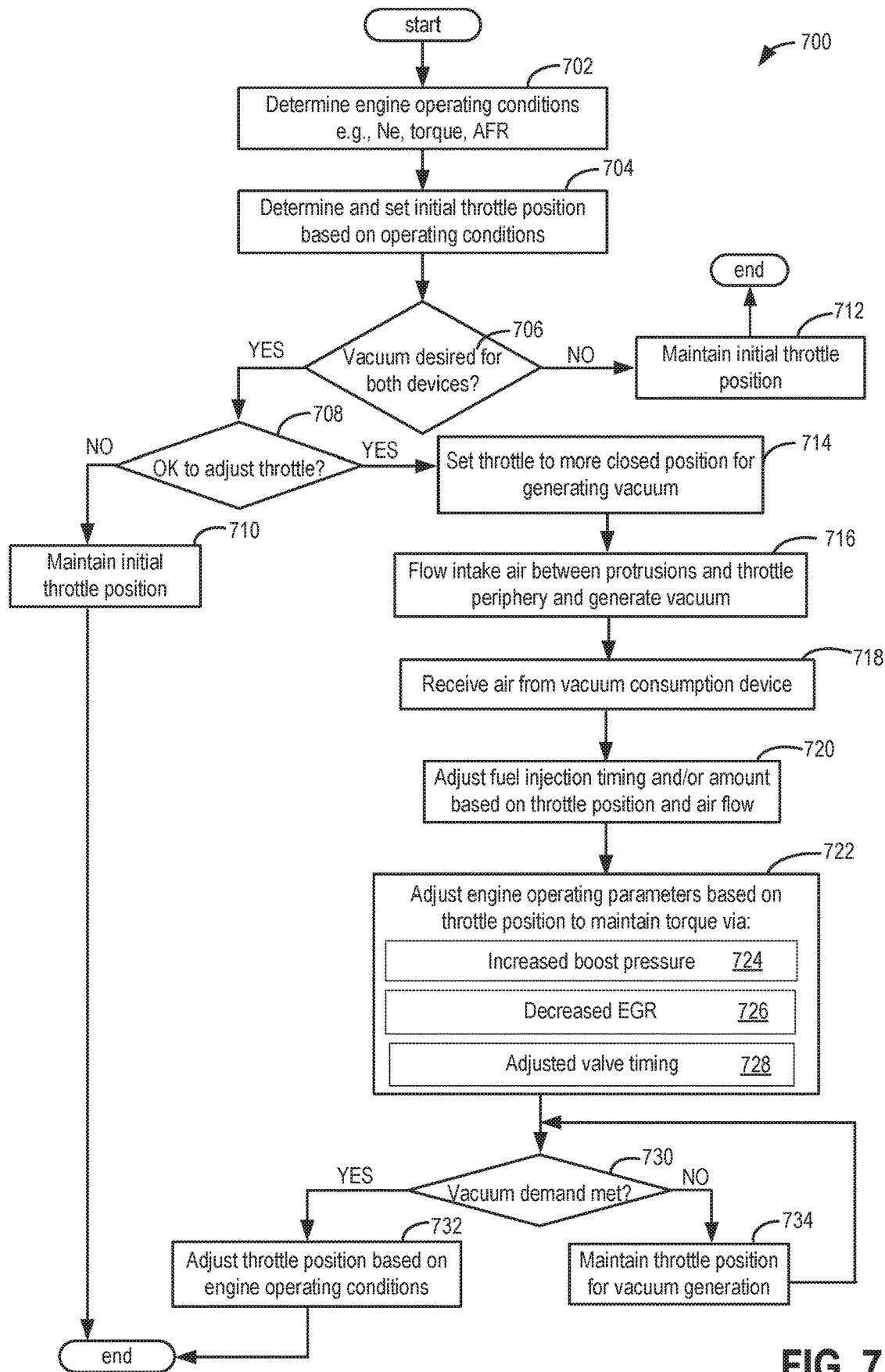
FIG. 7 shows a routine for adjusting the throttle based on one or more of engine operating parameters and vacuum demand from the first and second vacuum consumption devices.
Figure 8:
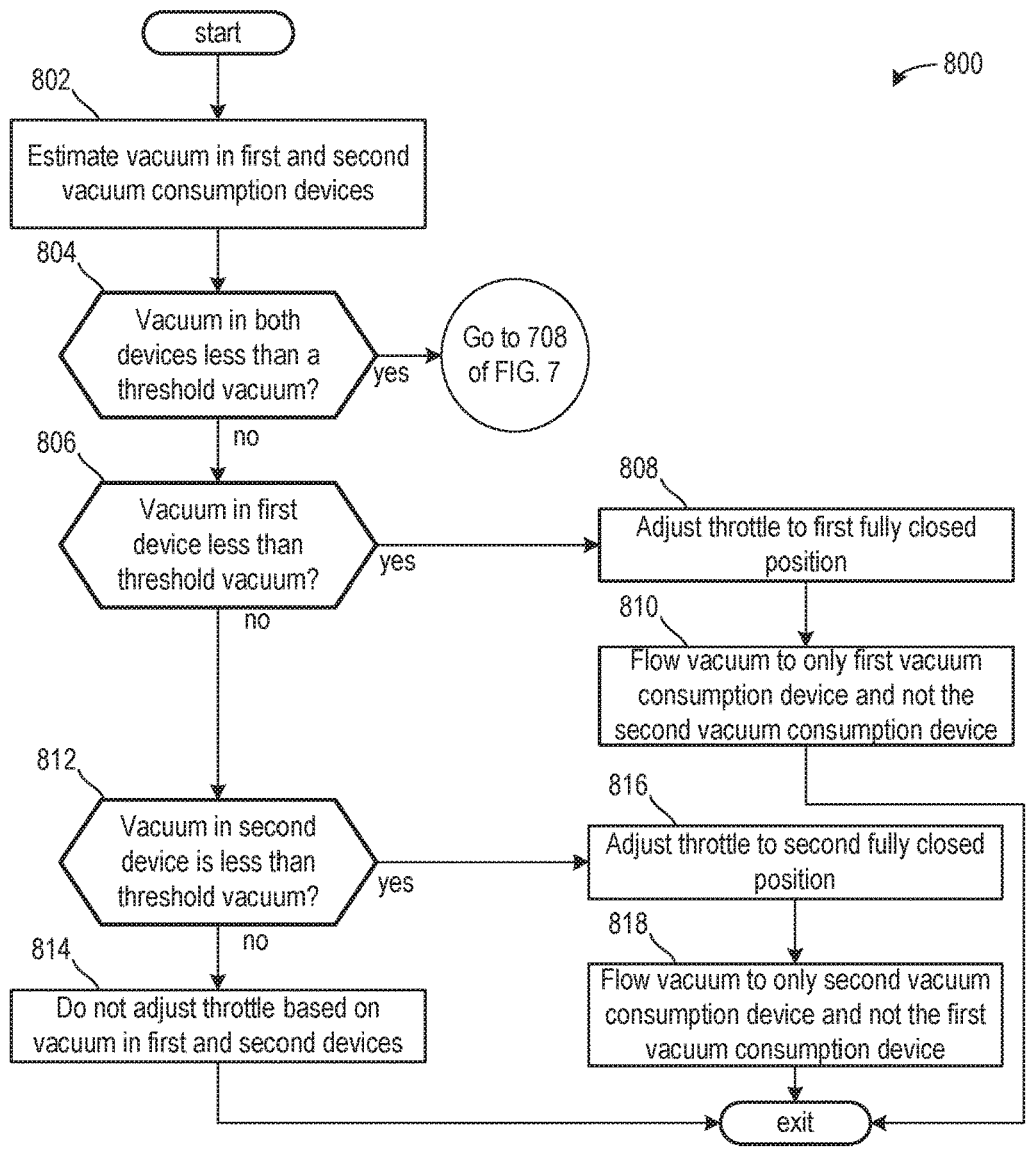
FIG. 8 shows a method for determining if each the vacuum consumption devices demand vacuum, only one of the vacuum consumption devices demands vacuum, or if none of the vacuum consumption devices demand vacuum.

A controller may be configured to perform a routine to modify a throttle position based on vacuum demand from the vacuum consumption device (FIG. 7). FIG. 8 shows a detailed routine illustrating a method for selecting one or two vacuum consumption devices to provide vacuum.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that FIGS. 2, 4A to 4E, 5, and 6 show arrows indicating where there is space for gas to flow, and the solid lines of the device walls show where flow is blocked and communication is not possible due to the lack of fluidic communication created by the device walls spanning from one point to another. The walls create separation between regions, except for openings in the wall which allow for the described fluid communication.

Referring now to FIG. 1, it shows a schematic depiction of a spark ignition internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion chamber 30 (also known as, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 96. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 162 arranged along intake passage 42. For a turbocharger, compressor 162 may be at least partially driven by a turbine 164 (e.g., via a shaft) arranged along exhaust passage 48. Compressor 162 draws air from intake passage 42 to supply boost chamber 46. Exhaust gases spin turbine 164 which is coupled to compressor 162 via shaft 161. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

A wastegate 168 may be coupled across turbine 164 in a turbocharger. Specifically, wastegate 168 may be included in a bypass 166 coupled between an inlet and outlet of the exhaust turbine 164. By adjusting a position of wastegate 168, an amount of boost provided by the turbine may be controlled.

Intake manifold 44 is shown communicating with throttle 62 having a throttle plate 64. In this particular example, the position of throttle plate 64 may be varied by controller 12 via a signal provided to an electric motor or actuator (not shown in FIG. 1) included with throttle 62, a configuration that is commonly referred to as electronic throttle control (ETC). Throttle position may be varied by the electric motor via a shaft. As elaborated below, throttle 62 may be at least partially flexible to allow the throttle to rotate about protrusions 68 of the intake passage. As shown, the vacuum consumption device 140 may be fluidly coupled to a portion of the intake passage 42 adjacent a periphery of the throttle 62 via the protrusions 68. Throttle 62 may control airflow from intake boost chamber 46 to intake manifold 44 and combustion chamber 30 among other engine cylinders. The position of throttle plate 64 may be provided to controller 12 by throttle position signal TP from throttle position sensor 58.

Engine 10 is coupled to vacuum consumption device 140 which may include, as non-limiting examples, one of a brake booster, a fuel vapor canister, positive crankcase ventilation (PCV) and a vacuum-actuated valve (such as a vacuum-actuated wastegate and/or EGR valve). Vacuum consumption device 140 may receive vacuum from a plurality of vacuum sources. One source may be vacuum pump 77 that may be selectively operated via a control signal from controller 12 to supply vacuum to vacuum consumption device 140. Check valve 69 allows air to flow to vacuum pump 77 from vacuum consumption device 140 and limits airflow to vacuum consumption device 140 from vacuum pump 77. Another source of vacuum may be protrusions 68 which are positioned diametrically opposed to one another in the boost chamber 46. As shown in FIG. 1, conduit 198 may extend through at least one of the protrusions 68 to fluidly couple the vacuum consumption device 140 to the intake. When throttle plate 64 is a first fully closed position, a second fully closed position, a partially closed position, or a partially open position, vacuum may be generated at one or more of the protrusions 68 such that vacuum in the vacuum consumption device 140 may be replenished. This vacuum may draw air from vacuum consumption device 140 through conduit 198, via the hollow shaft into at least one of the protrusions 68. Check valve 73 ensures that air flows from vacuum consumption device 140 to the intake manifold 44 and not from intake manifold 44 to vacuum consumption device 140.

For reasons of simplicity, only one of the vacuum consumption device 140 is illustrated in the embodiment of FIG. 1. However, it will be appreciated by those of ordinary skill in the art that the vacuum consumption device 140 may be two or more vacuum consumption devices. The vacuum consumption device 140 may comprise different types of vacuum consumption devices, for example, it may comprise a brake vacuum tank and a positive crankcase ventilation (PCV).

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof.

An exhaust gas recirculation (EGR) system may be used to route a desired portion of exhaust gas from exhaust passage 48 to intake manifold 44 through conduit 152 via EGR valve 153. Alternatively, a portion of combustion gases may be retained in the combustion chambers, as internal EGR, by controlling the timing of exhaust and intake valves.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle plate 64, EGR valve 153, and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by vehicle operator 132; a measurement of engine manifold pressure (MAP) from pressure sensor 121 coupled to intake manifold 44; a measurement of boost pressure from pressure sensor 122 coupled to boost chamber 46; a measurement of vacuum in vacuum consumption device 140 from pressure sensor 125, a profile ignition pickup signal (PIP) from Hall effect sensor 118 (or other type) coupled to crankshaft 40; a measurement of air mass entering the engine from mass airflow sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

The controller 12 receives signals from the various sensors of FIG. 1 and employs the various actuators of FIG. 1 to adjust engine operation based on the received signals and instructions stored on a memory of the controller. For example, adjusting the throttle plate may include adjusting an actuator of the throttle plate to adjust a position of the throttle plate. As an example, the actuator may be signaled to move the throttle plate to a more open position in response to a tip-in (e.g., accelerator pedal 130 in a more depressed position).

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time. In some examples, vehicle 5 may be a hybrid vehicle with multiple sources of torque available to one or more vehicle wheels 155. In other examples, vehicle 5 is a conventional vehicle with only an engine, or an electric vehicle with only electric machine(s). In the example shown, vehicle 5 includes engine 10 and an electric machine 152. Electric machine 152 may be a motor or a motor/generator. Crankshaft 40 of engine 10 and electric machine 152 are connected via a transmission 154 to vehicle wheels 155 when one or more clutches 156 are engaged. In the depicted example, a first clutch 156 is provided between crankshaft 40 and electric machine 152, and a second clutch 156 is provided between electric machine 152 and transmission 154. Controller 12 may send a signal to an actuator of each clutch 156 to engage or disengage the clutch, so as to connect or disconnect crankshaft 140 from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 158 to provide torque to vehicle wheels 155. Electric machine 152 may also be operated as a generator to provide electrical power to charge battery 158, for example during a braking operation.

FIG. 2 shows an embodiment 200 of an intake passage 202 comprising a throttle 210. In one example, the throttle 210 may be used similarly throttle 62 of FIG. 1. Additionally, the intake passage 202 may be used similarly to a combination of the intake passage 42 and the boost chamber 46 of FIG. 1. The intake passage 202 is configured to receive fresh intake air or compressed intake air at a location upstream of the throttle 210. The intake air may be directed to an engine (e.g., engine 10 of FIG. 1) for some positions of the throttle 210.

The terms upstream and downstream may be used to describe arrangements components relative to one another. For example, the throttle 210 is upstream of the engine 10 relative to a direction of intake air flow. As such, intake air may contact the throttle 210 before reaching the engine 10.

An axis system 290 comprises three axes, namely an x-axis parallel to a horizontal direction, a y-axis parallel to a vertical direction, and a z-axis perpendicular to both the x- and y-axes. Arrow 298 indicates a general horizontal direction of intake air flow, which is parallel to both the x-axis and a central axis 292 of the intake passage 202. In one example, the central axis 292 passes through a geometric center of the throttle 210. A direction of gravity is shown by arrow 299.

The intake passage 202 may comprise a plurality of protrusions 220 extending radially inwardly toward the central axis 292 of the intake passage 202. In one example, there are exactly two protrusions, including a first protrusion 222 and a second protrusion 224. The first protrusion 222 and the second protrusion 224 may be arranged exactly opposite one another along a single diameter of the intake passage 202. A vertical axis 294 is shown passing through geometric centers of the first 222 and second 224 protrusions. In one example, the first protrusion 222 and the second protrusion 224 are arranged diametrically opposite one another on interior surfaces of the intake passage 202.

For example, the intake passage 202 may comprise a uniform flow-through area along its entirety except for the location corresponding to the first protrusion 222 and the second protrusion 224. As such, the protrusions 220 may decrease the flow-through area of the intake passage 202 compared to other portions of the intake passage 202 such that a constriction is present. In one example, the intake passage 202 may be venturi shaped, wherein portions of the intake passage upstream and downstream of the protrusions 220 are similar to a venturi inlet and a venturi outlet, respectively, and where a portion of the intake passage aligned with the protrusions is similar to a venturi throat. Thus, in some positions of the throttle 210, air flow by the protrusions 220 may generate a vacuum, as will be described below.

The first protrusion 222 and the second protrusion 224 may be arc, dome, or similarly shaped (e.g., half sphere). In one example, the first protrusion 222 and the second protrusion 224 are exactly identical in shape and size. The first protrusion 222 may comprise a first opening 226 and the second protrusion 224 may comprise a second opening 228. The first opening 226 may fluidly couple a first vacuum consumption device 232 to the intake passage 202. The second opening 228 may fluidly couple a second vacuum consumption device 234 to the intake passage 202. The first 232 and second 234 vacuum consumption devices may be used similarly to the vacuum consumption device 140 of FIG. 1. In one example, the first vacuum consumption device is a brake tank vacuum and the second vacuum consumption device is a PCV. Additionally or alternatively, the conduit 198 of FIG. 1 may bifurcate such that it may fluidly couple to each of the first and second protrusions 222, 224. In some embodiments, each of the first vacuum consumption device 232 and the second vacuum consumption device 234 comprises its own conduit and as a result, a bifurcation may not be desired.

The first vacuum consumption device 232 and the second vacuum consumption device 234 may be selectively coupled to the intake passage 202 based on an actuation of the throttle 210. Specifically, actuating the throttle 210 may include rotating a throttle plate 212 and an outer rim 214. In one example, the throttle plate 212 may be used similarly to throttle plate 64 of FIG. 1. The rotating may be about a rotating axis, where the rotating axis is perpendicular each of the central axis 292 and the vertical axis 294 and parallel to the z-axis. When the throttle 210 is in a fully open position, the throttle plate 212 may be parallel to and aligned with the central axis 292. When the throttle 210 is in a partially closed position, such as the position illustrated in the embodiment of FIG. 2, the throttle plate 212 may be substantially parallel to the vertical axis.

Actuation of the throttle 210 may include actuating the throttle 210 to the fully open position, the partially closed position, or any position therebetween. In one example, there may be two fully closed positions, between the partially closed position and the fully open position. As an example, the fully open position may allow a maximum amount (e.g., 100%) of intake air to flow passed the throttle 210 and to the engine 10. Thus, the fully closed position(s) may decrease and/or prevent intake air from flowing from an ambient atmosphere to the engine 10. Positions between the fully closed and fully open positions may be configured to allow different amounts of intake air to flow to the engine 10. For example, a partially open position may allow more intake air to flow to the engine 10 than the partially closed position. In one example, the partially closed position allow a small amount of intake air (e.g., 10-20% of the amount allowed in the fully open position) to flow passed the throttle 210 to the engine 10.

The throttle plate 212 may be substantially circular and concentric with the outer rim 214 about the central axis 292. The throttle 210, including the throttle plate 212 and the outer rim 214, may be at least partially flexible. In one example, an entire body of the throttle 210, including the throttle plate 212 and the outer rim 214, is flexible. In another example, an outer periphery of the throttle 210, including the outer rim 214, is flexible, such that the throttle plate 212 may be inflexible. Inflexible refers to a component which may not bend, flex, or the like, and may instead crack or degradation (e.g., form a hole). Thus, flexible refers to a component which may bend and/or flex in response to a sufficient amount of force without cracking or degrading.

In some embodiments, additionally or alternatively, the throttle plate 212 may be an ellipses shape, wherein the throttle plate 212 may be shorter in a direction parallel to the vertical axis 294 and longer in a direction parallel to the z-axis, if the first 222 and second 224 protrusions are arranged on diametrically opposed surfaces of the intake passage 202. Additionally or alternatively, in some embodiments, the intake passage 202 may comprise a single protrusion, which extends around an entire circumference of the interior surface of the intake passage. In such an example, the throttle plate 212 may be substantially circular in shape.

As will be described in greater detail below with respect to FIG. 3A, the outer rim 214 may extend further along the upstream and downstream directions of the intake passage 202 compared to the throttle plate 212. Said another way, the outer rim 214 may comprise a greater profile along the x-axis than the throttle plate 212.

The throttle plate 212 and the outer rim 214 may be composed of similar materials. Alternatively, the throttle plate 212 and the outer rim 214 may be comprised of different materials. Both the throttle plate 212 and the outer rim may be impervious to gas flow. The throttle plate 212 may be metallic, plastic, polycarbonate, polyethylene, styrene, or the like. The throttle plate 212 may be physically coupled to the outer rim 214 along its outer circumference via adhesives, fusions, welds, screws, clamps, or the like. The outer rim 214 may be ring shaped and surround the throttle plate 212. The outer rim 214 may comprise a material different than the throttle plate 212. In one example, the outer rim 214 comprises rubber. It will be appreciated that the outer rim 214 may comprise other malleable and/or flexible materials without departing from the scope of the present disclosure. The throttle 210 is described in greater detail below.

Turning now to FIG. 3A, it shows a cross-sectional view 300 taken along the cutting plane A-A' of FIG. 2. In the cross-sectional view 300, the throttle 210 is shown in the partially closed position where a small amount of airflow may pass by the throttle 210 to the engine 10.

The throttle 210 may be actuated by a motor 310. An actuator 316 of the throttle 210 may rotated by the motor 310, resulting in rotation of the throttle plate 212 and the outer rim 214. The throttle plate 212 and the outer rim 214 may rotate in clockwise and/or counterclockwise directions about the rotation axis. In the partially closed position shown where the throttle plate 212 is parallel to the vertical axis 294, a small amount of ambient air may flow through the gaps formed between the outer rim 214 and the first 222 and second 224 protrusions. This is shown and described in more detail in FIG. 4B. A small amount of ambient air is small relative to amount of ambient air allowed to flow to an engine (e.g., engine 10 of FIGS. 1 and 2) when the gaps between the outer rim 214 and the first 222 and second 224 protrusions are larger. The gaps may be larger for partially open and fully open positions of the throttle 210.

As shown in the cross-sectional view 300, the outer rim 214 is substantially annular and extends in the upstream and downstream directions more than the throttle plate 212. Said another way, while the throttle plate 212 may be substantially circular and planar while the outer rim 214 may be substantially ring-shaped. In one example, the outer rim 214 is a cylinder with an open top and an open bottom. The outer rim 214 and the throttle plate 212 are fixedly coupled such that actuation of one leads to a similar actuation of the other.

Turning now to FIG. 3B, it shows an embodiment 350 depicting a flexibility of the outer rim 214. As described above, the outer rim 214 may comprise rubber, malleable materials, or a combination thereof. As such, the outer rim 214 may contact a surface (e.g., a protrusion) of the intake passage 202 and bend to allow additional rotation of the throttle 210 without allowing the throttle to become stuck. In one example, this is adjusted based on a power supply from the controller 12 to the motor 310. The bending is shown by dashed lines. In one example, only the outer rim 214 is flexible and the throttle plate 212 is inflexible.

In some embodiments, the outer rim 214 may contact the first 222 and second 224 protrusions. In one example, the outer rim 214 contacts each of the first 222 and second 224 protrusions simultaneously. However, the first protrusion 222 may comprise a first upstream surface 321 and a first downstream surface 323, where the surfaces are separated by the first opening 226. Similarly, the second protrusion 224 may comprise a second upstream surface 325 and a second downstream surface 327, where the surfaces are separated by the second opening 228.

In a first fully closed position of the throttle 210 (shown in FIG. 4C), the outer rim 214 may be pressed against the first upstream surface 321 and the second downstream surface 327. Thus, the throttle plate 212 may be angled to the vertical axis in the first fully closed position. The angle may be equal to an angle in a first angular range spanning 0 to 10 degrees. In the first fully closed position, intake air may not flow from upstream of the throttle 210 to the engine 10. However, the first vacuum consumption device 232 may receive vacuum from the engine when the throttle 210 is in the first fully closed position. Check valve 332, arranged in first conduit 331, may open in response to vacuum adjacent the first opening 226 being greater than a vacuum stored in the first vacuum consumption device 232. As such, vacuum in the first vacuum consumption device 232 may be replenished when the throttle is in the first fully closed position. The first conduit 331 and the check valve 332 may be used substantially similarly to the conduit 198 and the check valve 73 of FIG. 1, respectively.

In a second fully closed position of the throttle 210 (shown in FIG. 4D), the outer rim 214 may be pressed against the first downstream surface 323 and the second upstream surface 325. Thus, the throttle plate may be angled to the vertical axis 294 in the second fully closed position. The angle may be similar to the angle generated in the first fully closed position. In the second fully closed position, intake air may not flow from upstream of the throttle 210 to the engine. However, the second vacuum consumption device 234 may receive vacuum from the engine. Check valve 334, arranged in second conduit 333, may open in response to vacuum adjacent to the second opening 228 being greater than a vacuum of the second vacuum consumption device 234. As such, the vacuum in the second vacuum consumption device 234 may be replenished when the throttle 210 is in the second fully closed position. The second conduit 333 and the check valve 334 may be used substantially similarly to the conduit 198 and the check valve 73 of FIG. 1, respectively.

Turning now to FIGS. 4A through 4E, they show various positions of the throttle 210 and corresponding intake air flows and vacuum generation in the intake passage. For reasons of simplicity, the first 332 and second 334 check valves of the first 232 and second 234 vacuum consumption devices, respectively, are shown in open positions for each position of the throttle 210 where vacuum is generated in the intake passage 202. As such, it may be assumed that for the positions of the throttle 210 below, a vacuum generated in the intake passage 202 is greater than a vacuum stored in either of the first vacuum consumption device 232 or the second vacuum consumption device 234. However, it will be appreciated that the first 332 and second 334 check valves may not open if the vacuum generated in the intake passage 202 is less than a vacuum already stored in the first 232 and the second 234 vacuum consumption devices.

Intake air flow is shown via arrows 402. Suck flow is shown via arrows 404. Lastly, vacuum flow is shown via arrows 406. Suck flow may refer to gas flowing from a vacuum consumption device to the intake passage 202. The suck flow may flow in response to vacuum flowing to the vacuum consumption device. Arrow 499 represents a vertical direction, which is parallel to the vertical axis 294 of FIGS. 2 and 3A.

FIG. 4A shows an embodiment 400 of the throttle 210. In the embodiment 400, the throttle 210 is in a fully open position and perpendicular to the vertical direction 499. When in the fully open position, a maximum amount (e.g., 100%) of intake air 402 may flow passed the throttle 210 and to the engine. As illustrated, air may freely flow through the relatively large gaps formed between the outer rim 214 and the first 222 and second 224 protrusions. In one example, the gaps between the outer rim 214 and the first 222 and second 224 protrusions are larger than gaps of any other position of the throttle 210. Additionally, the fully open position may not generate vacuum. As such, the first 232 and second 234 vacuum consumption devices do not receive vacuum in the fully open position or provide suck flow to the intake passage, in one example. The fully open position may correspond to an engine load equal to a high engine load. In one example, the fully open position is demanded during a tip-in or other transient engine operation.

FIG. 4B shows an embodiment 410 of the throttle 210. In the embodiment 410, the throttle 210 is in a partially closed position and its throttle plate 212 is parallel to the vertical direction 499. The partially closed position may correspond to a position between the first fully closed position and the second fully closed position. In the partially closed position, intake air may flow through gaps formed between the outer rim 214 and the first 222 and second 224 protrusions. A venturi effect may occur as air flows through the gaps, thereby generating vacuum to be supplied to the first 232 and second 234 vacuum consumption devices. Check valves 332 and 334 may move to an open position in response to the vacuum generated being greater than vacuum stored in the first 232 and second 234 vacuum consumption devices.

For example, the first check valve 332 may move to an open position in response to a vacuum being greater than a vacuum stored in or available to the first vacuum consumption device 232, thereby fluidly coupling the first vacuum consumption device 232 to the intake passage 202 and allowing vacuum to flow from the intake passage 202 to the first vacuum consumption device 232 and suck flow to flow from the first vacuum consumption device 232 to the intake passage 202. The suck flow may mix with the intake air flow in the intake passage 202. Specifically, the suck flow flows from the first vacuum consumption device 232, through the conduit 331, through first check valve 332, through the first opening 226 of the first protrusion 222, and into the intake passage 202.

Additionally or alternatively, the second check valve 334 may move to an open position in response to a vacuum being greater than a vacuum of the second vacuum consumption device 234, thereby fluidly coupling the second vacuum consumption device 234 to the intake passage 202 and allowing vacuum to flow from the intake passage 202 to the second vacuum consumption device 234 and suck flow to flow from the second vacuum consumption device 234 to the intake passage 202. Specifically, the suck flow flows from the second vacuum consumption device 234, through the conduit 333, through the second check valve 334, through the second opening 228 of the second protrusion 224, and into the intake passage 202.

In this way, one or both of the first 232 and second 234 vacuum consumption devices may receive vacuum when the throttle 210 is in the partially closed position between the first and second fully closed positions. In one example, the partially closed position illustrated in the embodiment of FIG. 4B allows less intake air to the engine than any other position of the throttle 210, excluding the first and second fully closed positions.

The partially closed position may be desired in response to both the first and second vacuum consumption devices 232, 234 demanding vacuum and to an engine load being equal to a low load or idle. A substantially equal amount of vacuum may be supplied to each of the first 232 and second 234 vacuum consumption devices in the partially closed position.

FIG. 4C shows an embodiment 420 comprising the first fully closed position of the throttle 210. As described above, the first fully closed position may include the outer rim 214 being pressed against the first upstream surface 321 and the second downstream surface 327. As such, the first conduit 331 may be fluidly coupled to a portion of the intake passage 202 between the engine and the throttle 210 while the second conduit 333 may be fluidly coupled to a portion of the intake passage 202 upstream of the throttle 210. As shown, intake air does not flow passed the throttle 210 to the engine.

The first fully closed position may be desired when the first vacuum consumption device 232 demands vacuum, the second vacuum consumption device 234 does not demand vacuum, and an engine load is equal to a low load or idle. As such, vacuum from the intake manifold may be supplied to the first vacuum consumption device 232 and suck flow from the first vacuum consumption device 232 may flow to the engine. The vacuum provided to the first vacuum consumption device 232 when the throttle 210 is in the first fully closed position may be greater than or equal to the vacuum provided to the first vacuum consumption device 232 when the throttle 210 is in the partially closed position, as shown in FIG. 4B. In one example, the vacuum provided to the first vacuum consumption device 232 when the throttle is in the first fully closed position is greater than the vacuum provided in the partially closed position of FIG. 4B.

FIG. 4D shows an embodiment 430 comprising the second fully closed position of the throttle 210. As described above, the second fully closed position may include where the outer rim 214 is pressed against the first downstream surface 323 and the second upstream surface 325. As such, the first conduit may be fluidly coupled to the portion of the intake passage 202 upstream of the throttle 210 and the second conduit 333 may be fluidly coupled to the portion of the intake passage 202 between the throttle 210 and the engine. As shown, intake air does not flow to the engine.

The second fully closed position may be desired when the second vacuum consumption device 234 demands a vacuum, the first vacuum consumption 232 device does not demand a vacuum, and the engine load is equal to a low load or idle. As such, vacuum from the intake manifold may be supplied to the second vacuum consumption device 234 and suck flow from the second vacuum consumption device 234 may flow to the engine as a result. The vacuum provided to the second vacuum consumption device 234 when the throttle 210 is in the second fully closed position may be greater than or equal to the vacuum provided to the second vacuum consumption device 234 when the throttle 210 is in the partially closed position, as shown in FIG. 4B. In one example, the vacuum provided to the second vacuum consumption device 234 when the throttle 210 is in the second fully closed position is greater than the vacuum provided in the partially closed position of FIG. 4B.

Actuating the throttle 210 between the first fully closed position, the second fully closed position, and the partially closed position may not demand a bending of the outer rim 214. As such, a first threshold amount of power may be used to actuate the throttle 210 between these positions. In some examples, the first and/or second fully closed positions may be desired in response to little or no vacuum being available to the first and/or second vacuum consumption devices. If engine load is low or at idle and the low engine load and/or idle is estimated to span for longer than a threshold duration of time, then a method may include actuating the throttle 210 to the first fully closed position for at least half of the threshold duration of time and actuating the throttle to the second fully closed position for at least half of the threshold duration of time. In this way, both the first and second vacuum consumption devices may receive a deep vacuum. The threshold duration of time may be a non-zero value. In one example, the threshold duration of time is at least 30 seconds.

FIG. 4E shows an embodiment 440 comprising the throttle 210 being in a partially open position. In the partially open position, some intake air is allowed to flow through gaps formed between the outer rim 214 and the first 222 and second 224 protrusions. However, the amount of air permitted to flow to the engine when the throttle is in the partially open position may be less than the fully open position of FIG. 4A and greater than the partially closed position of FIG. 4B. Additionally or alternatively, an amount of air permitted to flow to the engine when the throttle 210 is in the partially open position may be adjusted by actuating the throttle 210 to a more open position or to a more closed position. The more open position may include actuating the throttle 210 from the position shown in embodiment 440 to a position nearer to the fully open position. As such, the intake air flow to the engine may increase while a vacuum generated between the throttle 210 and the protrusions may decrease. The more closed position may include actuating the throttle 210 from the position shown in embodiment 440 to a position nearer to the partially closed position. In response, intake air flow to the engine may decrease while a vacuum generated between the throttle 210 and the protrusions may increase. Thus, the partially open position produces more vacuum than the fully open position and less vacuum than the partially closed position.

As shown, the partially open position comprises a throttle position between the fully open position and the fully closed positions. The throttle 210 may be angled relative to the vertical direction 499 when in the partially open position. The angle may be equal to an angle in an angular range ranging between 15 to 85°. Thus, the angle generated in the partially open position is greater than an angle of the throttle in the fully closed positions.

The partially open position may be desired in response to each of the first 232 and second 234 vacuum consumption devices demanding vacuum and to an engine load being equal to a mid-load. An amount of vacuum provided to the first 232 and second 234 vacuum consumption devices may be substantially equal in the partially open position.

A motor (e.g., motor 310 of FIG. 3A) may actuate the throttle 210 through the positions shown in FIGS. 4A through 4E. A controller (e.g., controller 12 of FIG. 1) may receive feedback from one or more sensors and signal to the motor to where the throttle 210 is desired to be actuated based on the feedback. The controller may adjust a power supplied to the throttle 210 based on the desired position. For example, if it is desired to actuate the throttle 210 from the fully open position of FIG. 4A to the partially open position of FIG. 4E, then the controller may supply a first threshold amount of power to actuate the throttle. Likewise, if it is desired to actuate the throttle 210 from the partially open position of FIG. 4E to the second fully closed position of FIG. 4D, then the controller may supply the first threshold amount of power to actuate the throttle. However, if it is desired to actuate the throttle 210 from the partially closed position of FIG. 4B to the partially open position of FIG. 4E, then the controller may initially supply a second threshold amount of power followed by the first threshold amount of power. In one example, the second threshold amount of power is greater than the first threshold amount of power. The second threshold amount of power may rotate the throttle 210 hard enough such that the outer rim 214 bends and/or flexes, as shown in FIG. 3B, to allow the throttle 210 to move from the partially closed position, through either the first or second fully closed positions, and to the partially open position. Once the outer rim is cleared of the protrusions, the first threshold amount of power may be used to actuate the throttle the remaining distance to the partially closed position. In this way, the first threshold amount of power may be high enough to rotate the throttle 210, but may not be high enough to rotate the throttle 210 through a position where the outer rim 214 may bend and/or flex. Alternatively, the second threshold amount of power may be high enough to rotate the throttle 210 through any position, including positions where the outer rim 214 may bend and/or flex. By switching between the two when demanded, power consumption may be decreased.

FIG. 5 illustrates a schematic diagram of an embodiment 500 of a throttle plate, coupled to a vacuum consumption device that may be included in the intake of engine 10 of FIG. 1. An axis system 590 comprising three axes, namely, an x-axis parallel to a horizontal direction, a y-axis parallel to a vertical direction, and a z-axis perpendicular to both the horizontal and vertical directions. A direction of gravity is shown by arrow 599.

A central axis 595 of the intake conduit 502 is shown. A direction of incoming intake air (fresh intake air arrow) is parallel to the central axis 295. The throttle plate 564 may pivot about the central axis 295. In this way, a venturi passage 550 inside the throttle plate 564 may become parallel to the central axis 595 or perpendicular to the central axis 595, as shown.

Throttle plate 564 is shown positioned within boost chamber 46 of an intake as fresh intake air 582 flows through intake conduit 502. A first vacuum consumption device 542 and a second vacuum consumption device 544 are shown fluidly coupled via conduits 598A and 598B, respectively, of conduit 598 to a hollow shaft (not shown), which in turn are connected to opening 568 of throttle plate 564. The hollow shaft may be mounted on bearings coupled to an inner or outer surface of intake conduit 502. Throttle plate 564 may be partially hollow and includes first and second openings 530 and 540 at its periphery, opposite one another and approximately 90° away from opening 568. That is, the first and second openings 530 and 540 may be arranged along a circumference of the throttle plate 564. In one example, the first and second openings 530 and 540 may have a width that is less than the width of the throttle plate 564 along the z-axis. In an alternate example, where the throttle is shaped such that it narrows when going from the center of the throttle towards the edge (that is, a width of the throttle plate at the center is wider than a width of the throttle plate at the edge), the first and second openings 530 and 540 may have a width based on the width of the throttle at the edge. Further, the first and second openings 530 and 540 may be substantially identical in shape and size. Alternatively, the first and second openings 530 and 540 may be different in shape and/or size. In one example, both the first and second openings 530 and 540 are oblong. However, it will be appreciated that one of the openings may be oblong and the other rectangular without departing from the scope of the present disclosure.

In the given example, the first and second openings 530 and 540 are located at two diametrically opposite locations along the edge of the throttle plate 564. Specifically, in the example shown, the second opening 540 is located at a first location at a top edge 542 and the first opening 530 is located at a second location, diametrically opposite the first location, at a bottom edge 532 of throttle plate 564. In the depicted example, each of the first and second openings 530 and 540 is a single opening. Alternatively, the first and second openings 530 and 540 may be a plurality of smaller openings (e.g., a cluster of perforations). Additionally, the edge surface of throttle plate 564 may be designed to create a low static pressure when throttle plate 564 is in a partially closed, mostly closed, or fully closed position by forming constricted passages between the edge and the intake conduit 595.

The venturi passage 550 is located within a hollow region 565 of the throttle plate 564 between the first and second openings 530 and 540. Specifically, a first venturi end 552 is directly coupled to the first opening 530 and a second venturi end 554 is directly coupled to the second opening 540. A venturi throat 556 is located between the first venturi end 252 and the second venturi end 554. The first venturi end 552 and second venturi end 554 are shaped such that they both narrow (constrict) toward the venturi throat 556. As such, the venturi throat 556 is a narrowest portion of the venturi passage 550. Connecting passages 558A and 558B fluidly couple the conduits 598A and 598B to the venturi throat 556, respectively.

In one example, the conduits 598A and 598B are fluidly separated from one another. Thus, gases in the conduits 598A and 598B do not mix. Likewise, the connecting passages 558A and 558B may be fluidly separated, wherein the separation may extend into the venturi passage 550. Thus, the first venturi end 552 may be fluidly coupled to the conduit 598B and the second venturi end 554 may be fluidly coupled to the conduit 598A. Thus, gases from the conduits 598A and 598B may not mix until they flow into the intake conduit 502.

When engine load decreases and/or when an accelerator pedal moves to a more inclined position, throttle plate 564 may be adjusted by the controller to a more closed position within boost chamber 46. With throttle plate 564 situated in a more closed position, constricted passages may be created between an interior surface of intake conduit 502 and the periphery (edge) of throttle plate 564. In the example of FIG. 5, constricted passages may be created between top edge 542 and the top inside of intake conduit 502, and bottom edge 532 of throttle plate and the bottom inside edge of intake conduit 502. As intake air 582 flows through these constricted passages, a venturi effect is created, and vacuum 584 may be generated within these constricted passages. Specifically, intake airflow velocity may reach a higher value in these constricted passages while local static pressure may reach a lower value producing a vacuum 584 at or near the location of the first and second openings 530 and 540. When the vacuum 584 is applied to the vacuum consumption devices 542 and 544, suck flow 86 is drawn from the vacuum consumption devices 542 and 544 via conduits 598A and 598B, and connecting passages 558A and 558B, and then through venturi passage 550 and out of second and first openings 540 and 530 into intake air 582 flowing passed throttle plate 564, respectively.

Turning now to FIG. 6, it shows an embodiment 600 substantially identical to the embodiment 500 of FIG. 5. However, a difference between the two embodiments includes an arrangement of the conduits 598A and 598B. As shown in the embodiment 600, the conduits 598A and 598B are arranged along diametrically opposed surfaces of the throttle plate 564. Additionally, gases from the conduits 598A and 598B may mix within the venturi passage 550 as shown.

Thus, the embodiments of FIGS. 5 and 7 disclose a system comprising a throttle valve having a venturi passage located inside its throttle body, the venturi passage configured to receive intake air directly from an intake passage when the venturi passage is parallel to a direction of incoming intake air flow. The throttle valve may be beveled at top and bottom edges, the edges forming venturi passages outside the throttle body between the throttle body and an intake conduit. The top and bottom edges comprise openings located at extreme ends of the venturi passage inside the throttle body. The venturi passages between the throttle body and the intake conduit are formed when the throttle body is in a more closed position, and where the venturi passage inside the throttle body is parallel to the direction of incoming intake air flow when the throttle body is in a more open position, and where the more closed position allows less intake air to flow to an engine than the more open position.

The venturi passage is a first annular venturi passage located interior to a second annular venturi passage, the first annular venturi passage located on a geometric center of the throttle body and the second annular venturi passage located between an edge of the throttle body and the first annular venturi passage. The first annular venturi passage is fluidly coupled to the second annular venturi passage via a connecting passage located along a vertical axis. Additionally or alternatively, the first annular venturi passage is fluidly coupled to separate conduits leading to separate vacuum consumption devices. Additionally or alternatively, the first annular venturi passage may comprise a first portion and a second portion, both portions leading to a throat of the first annular venturi passage, and where the first portion is coupled to a conduit leading to a first vacuum consumption device and where the second portion is coupled to a conduit leading to a second vacuum consumption device, the conduits being fluidly separated from one another.

The first and second annular venturi passages are parallel to the direction of incoming intake air flow when the throttle body is in a closed position. The closed position includes edges of the throttle body being pressed against interior surfaces of an intake conduit preventing intake air from flowing therethrough.

The embodiments of FIGS. 5 and 6 further illustrate a system comprising an engine including an intake, a throttle plate mounted on a hollow shaft positioned in the intake, the throttle plate having a first opening located on its circumference and a second opening located on its circumference diametrically opposite the first opening, and a venturi passage located inside the throttle plate between the first and second openings, and a controller with computer-readable instructions stored in non-transitory memory for in response to engine operations, adjusting a position of the throttle plate to adjust intake air flow while generating vacuum through the adjusting of the throttle plate as intake air flows through the venturi passage or through constricted passages formed between the intake and the first and second openings. A vacuum consumption device, wherein the hollow shaft of the throttle plate is fluidly coupled to the vacuum consumption device and a throat of the venturi passage in the throttle plate. The vacuum consumption device is a first vacuum consumption device one of a brake booster, a fuel vapor canister, and a vacuum actuated valve, further comprising a second vacuum consumption device fluidly coupled to the venturi passage.

In one example, the first and second vacuum consumption devices comprise conduits next to and fluidly separated from one another, the conduits being fluidly coupled to different halves of the venturi passage. As another example, the first and second vacuum consumption devices comprise conduits extending to the venturi passage through diametrically opposed positions of the throttle plate.

The first opening faces an upstream direction and the second opening faces a downstream direction relative to a direction of incoming intake air flow when the throttle plate is in a more open position, and where intake air enters the venturi passage via the first opening and exits the venturi passage via the second opening. The first opening and second opening face an interior surface of an intake conduit of the intake when the throttle plate is in a more closed position, and where intake air flows through constricted passages located between the intake conduit and the first and second openings. The venturi passage narrows between the first and second openings toward a venturi throat such that the venturi throat is a narrowest portion of the venturi passage.

The embodiments of FIGS. 5 and 6 further comprise a system comprising a throttle body located along an intake conduit configured to receive intake air via a first venturi passage or a second venturi passage located inside the throttle body, and where edges of the throttle body are sealed with interior surfaces of the intake conduit in a closed position. The first venturi passage and second venturi passage are annular, and where the first venturi passage is located along a geometric center of the throttle body and is interior to the second venturi passage. Intake air only flows by the throttle body by flowing through the first and second venturi passages when the throttle body is in the closed position, and where intake air flows through an opening formed between the intake conduit and throttle body when the throttle body is in an open position. The first venturi passage and the second venturi passage are fluidly coupled via a connecting passage, the connecting passage being further coupled to a vacuum consumption device.

Turning now to FIG. 7, it shows an example routine 700 that a controller may perform to adjust a throttle plate (herein, also termed throttle) position in response to vacuum demand from a vacuum consumption device coupled to the throttle plate. The routine 700 may be used in combination with throttle 210 of FIG. 2. Instructions for carrying out routine 700 and other methods included herein may be executed by the controller based on instructions stored on a memory of the controller and in conjunction with signals received from sensors of the engine system, such as the sensors described above with reference to FIG. 1. The controller may employ engine actuators of the engine system to adjust engine operation, according to the methods described below. Additionally, the controller may modify one or more engine operating parameters responsive to the adjusting of the throttle plate in order to maintain engine torque.

At 702, engine operating conditions may be determined. Engine operating conditions may include engine speed, torque demand, combustion air-fuel ratio, boost pressure, manifold absolute pressure, mass airflow, engine temperature, etc. Once engine operating conditions are estimated, at 704, an initial throttle position may be determined and set based on these engine operating conditions. For example, as the operator torque demand increases, the throttle may be moved to a more open position to increase intake airflow. As another example, if combustion air-fuel ratio is determined to be leaner than a desired stoichiometric value, the throttle may be set to a more closed position to reduce intake airflow. In yet another example, if engine idling conditions are met, the throttle may be moved to a fully closed position. Alternatively, if high engine load conditions are met, the throttle may be moved to a fully open position. The more closed position may correspond to the partially open position described above with respect to FIG. 4E. Similarly, the more closed position may correspond to the partially closed position described above with respect to FIG. 4B. Additionally or alternatively, a more open position may correspond to a partially open position nearer to the fully open position while a more closed position may correspond to a partially closed position nearer to one of the fully closed positions with respect to the throttle of FIG. 2.

At 706, routine 700 may determine if vacuum is desired by one or more vacuum consumption devices coupled to the throttle. In one example, vacuum may be demanded when the vacuum consumption device is actuated. In another example, if the vacuum consumption device includes a vacuum reservoir, it may be determined if the vacuum requirement of the device exceeds the vacuum available in the reservoir. If it is determined that vacuum is not desired, at 712, the initial throttle position may be maintained and the routine ends. The throttle position may then continue to be adjusted based on engine operating conditions only, and not based on vacuum requirement of the vacuum consumption device.

On the other hand, if it is determined that the vacuum consumption device desires vacuum assistance, at 708, routine 700 may assess whether engine conditions allow a change in throttle position. In particular, it may be determined if the engine conditions permit a change in the throttle position towards a more closed position where intake airflow to the engine is reduced. As such, there may be engine conditions where changes in throttle position may be tolerated without affecting engine performance. In addition, there may be conditions where the throttle position is limited or constrained. For example, if the vehicle is accelerating on a highway and engine speed is higher than a threshold, the throttle may be positioned in a mostly open or fully open position to allow higher airflow. In this situation, the throttle position may not be moved to a more closed or fully closed position for generating vacuum as it would adversely affect engine torque output and performance. Thus, if it determined that the position of the throttle cannot be adjusted, at 710, the controller maintains the throttle at its initial position and the routine ends. The throttle position may then continue to be adjusted based on engine operating conditions only, and not based on the vacuum requirement of the vacuum consumption device.

However, if it is assessed that engine conditions permit a change in throttle position, and more specifically the conditions permit a decrease in throttle position, at 714, the throttle may be moved towards a more closed position than the initial position. The adjustment to the position of the throttle may depend on the level of vacuum desired by the vacuum consumption device. For example, if a higher level of vacuum is desired, the throttle may be moved further towards one of the fully closed positions (e.g., the throttle may be fully closed). Selection of which of the fully closed positions to actuate the throttle to is described in greater detail with respect to FIG. 8. On the other hand, if a lower level of vacuum is desired, the controller may adjust the throttle to a slightly closed or partially closed position. Thus, as the level of desired vacuum from the vacuum consumption device increases, the throttle may be moved towards a more closed position. In one example, if it is determined at 708 that the throttle is already in a closed position during engine idling, the throttle position may be retained, at 714, without further adjustments.

In some examples, the throttle plate may be moved to a more closed or a more open position in response to the demand for vacuum. When in the partially closed position, such as the position shown in FIG. 4B, intake air may flow between gaps formed between the throttle periphery and the protrusions of the intake passage.

Next, at 716, vacuum may be generated at the throttle plate as intake air flows through venturi passages formed between an outer rim of the throttle and protrusions of the intake passage. At 718, the generated vacuum may be applied to the vacuum consumption devices to enable the devices to be actuated or operated. For example, where one of the vacuum consumption devices is a brake booster, the generated vacuum may be applied to enable wheel braking. As another example, where one of the vacuum consumption devices is a vacuum actuated valve (e.g., PCV valve), the generated vacuum may be applied to enable valve actuation. As vacuum is applied to the vacuum consumption device, air is received from the vacuum consumption device at the protrusions and fed to the intake passage.

At 720, one or both of fuel injection amount and injection timing may be adjusted based on the throttle position and existing airflow to maintain engine torque. Existing airflow may be a combination of fresh intake air that flows past the perforated edge of the throttle and air flowing from the vacuum consumption devices, through the protrusions, and into the intake. In one example, the fuel injection amount and/or timing may be adjusted to maintain a cylinder air-fuel ratio at or close to a desired ratio, such as stoichiometry. In another example, fuel injection amount and/or timing may be modified to maintain engine combustion for torque. In yet another example, one or both of fuel injection timing and fuel injection amount may be varied to maintain each of engine torque and a stoichiometric air fuel ratio.

In one example, during engine idling conditions, as the throttle is adjusted to a fully closed position, airflow via the throttle is reduced while airflow from one of the vacuum consumption devices into the intake manifold is increased. Based on the total airflow being smaller, a fuel injection amount may be decreased to maintain air-fuel ratio. The fuel injection amount may be reduced by decreasing a pulse width of the fuel injection. Further, fuel injection timing may be advanced or retarded based on engine torque requirement.

At 722, one or more engine operating parameters may be varied in response to the adjustment of throttle position and the flowing of air from one or more of the vacuum consumption devices. Engine operating parameters may be modified to maintain engine torque output. For example, boost pressure may be increased at 724 as the throttle plate is moved to a more closed position at 714. To increase boost pressure, a wastegate coupled across an exhaust turbine may be adjusted to a less open position to allow a larger quantity of exhaust gases to flow past the exhaust turbine. By increasing boost pressure in the boost chamber within the intake, a drop in engine torque resulting from the throttle closing can be compensated for.

Engine torque output may also be maintained by decreasing a rate of exhaust gas recirculation (EGR) at 726. As the throttle is moved to a more closed position, an EGR valve in an EGR passage coupling the engine exhaust to the engine intake may be adjusted to a more closed position to allow a smaller proportion of exhaust gases to be recirculated into the intake. Thus, by reducing the flow of exhaust residuals into the intake, engine dilution is reduced, and the aircharge within engine cylinders may comprise a larger proportion of fresh intake air allowing the engine to maintain its torque output.

At 728, valve timing may be adjusted to retain engine torque levels. In one example, the intake valve may be held open for a longer duration to allow more fresh air into the cylinder. In another example, exhaust valve timing may be modified to reduce the proportion of internal EGR within the cylinder. Further still, each of intake and exhaust valve timing may be adjusted to vary an amount of valve overlap. For example, valve overlap may be reduced to improve engine torque output.

It will be appreciated that the controller may select one or more of the various engine operating parameters described above to maintain torque based on existing operating conditions. For example, during a first condition, where the vehicle is operating under steady state driving conditions when the throttle position is modified to generate vacuum, the controller may only increase boost pressure but not reduce EGR to maintain engine torque output. During a second condition, as the throttle is closed, boost pressure may be maintained while EGR dilution is reduced. In another example, during a third condition, each of internal and external EGR reduction may be used. For example, an exhaust valve may be closed relatively early to reduce internal EGR within the cylinder and an opening of the EGR valve for external EGR may be decreased simultaneously to reduce external EGR into the intake. During a fourth condition, as the throttle position is closed, the controller may reduce EGR while also increasing boost pressure. Still other combinations may be possible.

Next at 730, routine 700 may confirm that sufficient vacuum has been generated to meet the demand of the vacuum consumption device. If it is determined that the demand has not been met, at 734, the throttle position set at 714 may be maintained and vacuum may continue to be generated for a longer duration. In another example, if the throttle is not fully closed at 714, the throttle may be moved to a fully closed position to generate more vacuum, if engine operating conditions allow this adjustment. Routine 700 may then return to 730 to determine if vacuum demand has been met.

If it is determined that sufficient vacuum has been generated for the vacuum consumption device, at 732, the throttle may be adjusted back to its initial position. Alternatively, the throttle may be moved to a position based only on the existing engine operating conditions.

Turning now to FIG. 8, it shows a method 800 for determining if both vacuum consumption devices demand vacuum or only one of the two. The method 800 may be used in combination with the embodiments of FIGS. 2 through 4E and prior to the execution of routine 700 of FIG. 7.

The method 800 may begin at 802 where the method may include estimating a vacuum in the first and second vacuum consumption devices (e.g., first 232 and second 234 vacuum consumption devices of FIG. 2). A first pressure sensor coupled to the first vacuum consumption device may provide feedback regarding a vacuum store of the first vacuum consumption device. Likewise, a second pressure sensor coupled to the second vacuum consumption device may provide feedback regarding a vacuum store of the second vacuum consumption device. Additionally or alternatively, vacuum stores of the first and second vacuum consumption device may be tracked based on vehicle mileage or the like.

The method 800 may proceed to 804 to determine if vacuum in both the first and second vacuum consumption devices is less than a threshold vacuum. The threshold vacuum may be equal to a 20% vacuum store of the device. As such, if less than 20% vacuum is present in the first and second vacuum consumption devices, then the method 800 may proceed to 708 of FIG. 7. However, if vacuum in at least one of the vacuum consumption devices is greater than or equal to the threshold vacuum, then the method 800 may proceed to 806 to determine if the vacuum store in the first vacuum consumption device is less than the threshold vacuum. If the vacuum in the first vacuum consumption device is less than the threshold vacuum, then the method 800 may proceed to 808 to adjust the throttle to the first fully closed position, similar to the position shown in FIG. 4C. The first threshold amount of power may be supplied to the motor of the throttle to actuate the throttle to the first fully closed position.

The method 800 may proceed to 810, where the method may include flowing vacuum to only the first vacuum consumption device. Additionally, vacuum may not flow to the second vacuum consumption device. Furthermore, intake air may not flow from an ambient atmosphere to an engine. In one example, the engine only receives suck flow from the first vacuum consumption device when the throttle is in the first fully closed position.

Returning to 806, if the vacuum in the first vacuum consumption device is greater than or equal to the threshold vacuum, then the method may proceed to 812 to determine if the vacuum in the second vacuum consumption device is less than the threshold vacuum. If the vacuum in the second vacuum consumption device is greater than or equal to the threshold vacuum, then the method may proceed to 814, where the method may include not adjusting the throttle based on vacuum in the first and second vacuum consumption devices. As such, the throttle may be actuated based on one or more engine conditions, driver demand, and the like. In this way, vacuum in the intake passage may be inadvertently generated due to the throttle being actuated due to the engine conditions. By doing this, vacuum may be supplied to the first and second vacuum consumption devices outside of a vacuum demand (e.g., outside of a stored vacuum being less than the threshold vacuum) if the vacuum generated is greater than a vacuum stored in one or more of the first and second vacuum consumption devices.

If the vacuum in the second vacuum consumption device is less than the threshold vacuum, then the method 800 may proceed to 816 to adjust the throttle to the second fully closed position, as shown in FIG. 4D.

The method 800 may proceed to 818, where the method may include flowing vacuum to only the second vacuum consumption device. Additionally, vacuum may not flow to the first vacuum consumption device. Furthermore, intake air may not flow from an ambient atmosphere to an engine. In one example, the engine only receives suck flow from the second vacuum consumption device when the throttle is in the second fully closed position.

In some examples, the method 800 may further include actuating the throttle to each of the fully closed positions of the throttle. For example, if it is determined that an engine load will be low or at idle or under some other condition where small amounts of intake air are desired (e.g., less than 10% intake air flow compared to a fully open position of the throttle) for longer than a threshold duration, then there may be a sufficient amount of time to provide deep vacuum to each of the vacuum consumption devices. In one example, determining which of the vacuum consumption devices receives vacuum first may be determined based on which of the vacuum consumption devices comprises the least amount of vacuum. As an example for the embodiment of FIG. 2, if the second vacuum consumption device comprises less vacuum than the first vacuum consumption device, then the throttle may be actuated to the second fully closed position for at least half of the threshold duration. The throttle may then be actuated to the first fully closed position to provide vacuum to the first vacuum consumption device after at least half of the threshold duration has passed.

In this way, a throttle arranged between protrusions of an intake passage may comprise a flexible portions to selectively engage with the protrusions to adjust vacuum generated in the intake passage. The throttle may selectively engage based on a signal from a controller dictating a force of rotation of the throttle. If the force of rotation is associated with a first threshold amount of power being supplied to the motor, then the throttle may contact and not bend against the protrusions. If the force of rotation is associated with a second threshold amount of power, which may be greater than the first, then the throttle may contact and bend against the protrusions. The technical effect of providing an at least partially flexible throttle in an engine intake is to allow the throttle to achieve two separate fully closed positions, wherein each position provides a deep vacuum to a different vacuum consumption device. By doing this, packaging constraints may be reduced and manufacturing costs may decrease.

A method comprising adjusting a throttle valve to a first fully closed position in response to vacuum of a first vacuum consumption device being less than a threshold vacuum, and adjusting the throttle valve to a second fully closed position in response to vacuum of a second vacuum consumption device being less than the threshold vacuum. A first example of the method further comprises where adjusting the throttle valve to a partially closed position in response to the first and second vacuum consumption device vacuums being less than the threshold vacuum, and where the partially closed position is between the first and second fully closed position. A second example of the method, optionally including the first example, further includes where the first vacuum consumption device is a brake booster and the second vacuum consumption device is a positive crankcase ventilation. A third example of the method, optionally including the first and/or second examples, further includes where the throttle valve comprises a circular throttle plate circumferentially surrounded by an outer rim, wherein the outer rim is flexible. A fourth example of the method, optionally including one or more of the first through third examples, further comprises where the throttle valve is rotatably arranged in an engine intake passage, the engine intake passage comprising one or more protrusions arranged in a path of the throttle valve and configured to contact a periphery of the throttle valve.

A method comprising rotating a flexible throttle at a first threshold amount of power to prevent the flexible throttle from bending when in contact with one or more of a plurality of protrusions of an intake passage and rotating the flexible throttle at a second threshold amount of power to allow the flexible throttle to bend when contacting the protrusions. A first example of the method further includes where the first threshold amount of power is less than the second threshold amount of power. A second example of the method, optionally including the first example, further includes where the flexible throttle is flexible about its entire body. A third example of the method, optionally including the first and/or second examples, further includes where the flexible throttle comprises an outer rim circumferentially surrounding a throttle plate, and where the outer rim is flexible and the throttle plate is inflexible. A fourth example of the method, optionally including one or more of the first through third examples, further includes where rotating the flexible throttle is in response to one or more of a first vacuum consumption device vacuum being less than a threshold vacuum and a second vacuum consumption device vacuum being less than the threshold vacuum.

A system comprising a flexible throttle arrange in an intake passage comprising a plurality of protrusions arranged along a vertical axis, wherein the flexible throttle is perpendicular to the vertical axis in a fully open position, the flexible throttle is at a first angle to the vertical axis in a partially open position, where the first angle is within a first angular range, the flexible throttle is at a second angle in a first fully closed position or a second fully closed position, where the second angle is less than the first angle and within a second angular range, and where the flexible throttle is parallel to the vertical axis in a partially closed position.

A first example of the system, further includes where a controller with computer-readable instructions stored on non-transitory memory thereon that when executed enable the controller to actuate the flexible throttle at a first threshold power when actuating the flexible throttle between positions where a periphery of the flexible throttle does not pass through the protrusions, and actuate the flexible throttle at a second threshold power when actuating the flexible throttle between positions where the periphery of the flexible throttle passes through the protrusions. A second example of the system, optionally including the first examples, further includes where the flexible throttle bends at least at its outer periphery as it passes through the protrusions. A third example of the system, optionally including the first and/or second examples, further includes where the flexible throttle is actuated at the second threshold power when it is desired to move the flexible throttle from the partially closed position to any other position of the flexible throttle. A fourth example of the system, optionally including one or more of the first through third examples, further includes where the protrusions are dome-shaped, identical, and include a first protrusion and a second protrusion arranged on diametrically opposed surfaces of the intake passage, wherein the first protrusions fluidly couples a first vacuum consumption device to the intake passage, and where the second protrusion fluidly couples a second vacuum consumption device, different than the first, to the intake passage. A fifth example of the system, optionally including one or more of the first through fourth examples, further includes where the first fully closed position comprises where a periphery of the flexible throttle is in contact with a first protrusion upstream surface and a second protrusion downstream surface, and where the first vacuum consumption device is fluidly coupled to a first portion of the intake passage and where the second vacuum consumption device is fluidly coupled to a second portion of the intake passage, where the first portion is arranged between the flexible throttle and an engine and where the second portion is arranged between the flexible throttle and an ambient atmosphere. A sixth example of the system, optionally including one or more of the first through fifth examples, further includes where the second fully closed position comprises where the periphery of the flexible throttle is in contact with a first protrusion downstream surface and a second protrusion upstream surface, and where the first vacuum consumption device is fluidly coupled to the second portion of the intake passage and where the second vacuum consumption device is fluidly coupled to the first portion of the intake passage. A seventh example of the system, optionally including one or more of the first through sixth examples, further includes where the first and second fully closed positions do not allow intake air to flow from the second portion to the first portion. A eighth example of the system, optionally including one or more of the first through seventh examples, further includes where the partially closed position is between the first fully closed position and the second fully closed position, where vacuum is generated at each of the protrusions of the intake passage in the partially closed position and the partially open position, and where the vacuum generated in the partially closed position is greater than the vacuum generated in the partially open position. A ninth example of the system, optionally including one or more of the first through eighth examples, further includes where the flexible throttle comprises an inflexible plate and a flexible outer rim surrounding a circumference of the inflexible plate, and where the outer rim is a cylinder shape with an open top and open bottom.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    rotating a flexible throttle at a first threshold amount of power to prevent the flexible throttle from bending when in contact with one or more of a plurality of protrusions of an intake passage;
    rotating the flexible throttle at a second threshold amount of power to allow the flexible throttle to bend when contacting the plurality of protrusions;
    generating vacuum at the flexible throttle for at least first and second vacuum consumption devices coupled to the flexible throttle via the rotating;
    fully closing the flexible throttle to a first fully closed position in response to vacuum of the first vacuum consumption device being less than a threshold vacuum; and
    fully closing the flexible throttle to a second, different, fully closed position in response to vacuum of the second vacuum consumption device being less than the threshold vacuum.

2. The method of claim 1, wherein the power includes power from an electric motor and wherein the first threshold amount of power is less than the second threshold amount of power.

3. The method of claim 1, wherein the flexible throttle is flexible about its entire body, and wherein the flexible throttle is allowed to bend to provide additional rotation of the flexible throttle without becoming stuck when contacting the plurality of protrusions of the intake passage.

4. The method of claim 1, wherein the flexible throttle comprises an outer rim circumferentially surrounding a throttle plate, and where the outer rim is flexible and the throttle plate is inflexible.

5. The method of claim 1, further comprising adjusting a throttle valve to a partially closed position in response to vacuum of the first and second vacuum consumption devices being less than the threshold vacuum, and where the partially closed position is between the first and second fully closed positions.

6. The method of claim 1, wherein the first vacuum consumption device is a brake booster and the second vacuum consumption device is a positive crankcase ventilation.

7. The method of claim 1, wherein one or more protrusions are arranged in a path of a throttle valve and configured to contact a periphery of the throttle valve.

8. The method of claim 1, wherein the plurality of protrusions is arranged along a vertical axis, wherein the flexible throttle is perpendicular to the vertical axis in a fully open position, the flexible throttle is at a first angle to the vertical axis in a partially open position, where the first angle is within a first angular range, the flexible throttle is at a second angle in the first fully closed position or the second fully closed position, where the second angle is less than the first angle and within a second angular range, and where the flexible throttle is parallel to the vertical axis in a partially closed position.

9. The method of claim 8, wherein the flexible throttle bends at least at its outer periphery as it passes through the plurality of protrusions.

10. The method of claim 8, wherein the plurality of protrusions is dome-shaped, identical, and includes a first protrusion and a second protrusion arranged on diametrically opposed surfaces of the intake passage, wherein the first protrusion fluidly couples the first vacuum consumption device to the intake passage, and where the second protrusion fluidly couples the second vacuum consumption device, different than the first, to the intake passage.

11. The method of claim 1, wherein the first fully closed position comprises where a periphery of the flexible throttle is in contact with a first protrusion upstream surface and a second protrusion downstream surface, and where the first vacuum consumption device is fluidly coupled to a first portion of the intake passage and where the second vacuum consumption device is fluidly coupled to a second portion of the intake passage, where the first portion is arranged between the flexible throttle and an engine and where the second portion is arranged between the flexible throttle and an ambient atmosphere.

12. The method of claim 11, wherein the second fully closed position comprises where the periphery of the flexible throttle is in contact with a first protrusion downstream surface and a second protrusion upstream surface, and where the first vacuum consumption device is fluidly coupled to the second portion of the intake passage and where the second vacuum consumption device is fluidly coupled to the first portion of the intake passage.

13. The method of claim 12, wherein the first and second fully closed positions do not allow intake air to flow from the second portion to the first portion.

14. The method of claim 1, wherein the flexible throttle comprises an inflexible plate and a flexible outer rim surrounding a circumference of the inflexible plate, and where the outer rim is a cylinder shape with an open top and an open bottom.

* * * * *